(12) United States Patent
Simard et al.

(10) Patent No.: US 9,071,145 B2
(45) Date of Patent: Jun. 30, 2015

(54) POWER STEALING CIRCUITRY FOR A CONTROL DEVICE

(75) Inventors: Pierre Simard, St-Bruno (CA); Benoit Meilleur, Lasalle (CA); Daniel Tousignant, St-Jean-sur-Richelieu (CA)

(73) Assignee: Honeywell International Inc., Morristown, NJ (US)

( * ) Notice: Subject to any disclaimer, the term of this patent is extended or adjusted under 35 U.S.C. 154(b) by 759 days.

(21) Appl. No.: 13/325,389

(22) Filed: Dec. 14, 2011

(65) Prior Publication Data

US 2012/0155137 A1   Jun. 21, 2012

Related U.S. Application Data

(63) Continuation of application No. 12/182,077, filed on Jul. 29, 2008, now Pat. No. 8,110,945.

(51) Int. Cl.
```
H02J 3/24      (2006.01)
H02M 7/217     (2006.01)
H02M 5/257     (2006.01)
H02M 1/00      (2007.01)
```

(52) U.S. Cl.
CPC .......... *H02M 7/2176* (2013.01); *Y10T 307/625* (2015.04); *Y10T 307/544* (2015.04); *Y10T 307/675* (2015.04); *H02M 5/2573* (2013.01); *H02M 2001/0006* (2013.01)

(58) Field of Classification Search
USPC ........................................................ 307/102
See application file for complete search history.

(56) References Cited

U.S. PATENT DOCUMENTS

| | | |
|---|---|---|
| 4,078,720 A | 3/1978 | Nurnberg |
| 4,093,943 A | 6/1978 | Knight |
| 4,157,506 A | 6/1979 | Spencer |
| 4,308,991 A | 1/1982 | Peinetti et al. |
| 4,504,778 A | 3/1985 | Evans |
| 4,528,459 A | 7/1985 | Wiegel |
| 4,695,246 A | 9/1987 | Beilfuss et al. |

(Continued)

FOREIGN PATENT DOCUMENTS

| | | |
|---|---|---|
| CA | 1035448 A1 | 7/1978 |
| FR | 2491692 A1 | 4/1982 |
| WO | 0131805 A1 | 5/2001 |
| WO | 03043171 A1 | 5/2003 |
| WO | 20060022838 | 3/2006 |

OTHER PUBLICATIONS

All Foreign and NPL References Were Previously Provided in Parent U.S. Appl. No. 12/182,077, filed Jul. 29, 2008.

(Continued)

*Primary Examiner* — Jared Fureman
*Assistant Examiner* — Duc M Pham
(74) *Attorney, Agent, or Firm* — Seager Tufte & Wickhem LLC.

(57) ABSTRACT

A power stealing circuit for stealing power to operate a control device is disclosed. In one illustrative embodiment, power may be periodically or intermittently diverted from a power source to a power stealing block. When power is diverted to the power stealing block, the power stealing block may steal power from the power source and store the stolen power on a storage device. The storage device may then provide operating power to a control device. In some embodiments, the power stealing block may include a first path for charging the storage device when a switch is ON, and a second path for charging the storage device when the switch is off.

3 Claims, 5 Drawing Sheets

(56) References Cited

U.S. PATENT DOCUMENTS

| | | | |
|---|---|---|---|
| 4,716,353 A | 12/1987 | Engelmann | |
| 4,745,300 A | 5/1988 | Kammerer et al. | |
| 4,776,514 A | 10/1988 | Johnstone et al. | |
| 4,806,843 A | 2/1989 | Mertens et al. | |
| 4,842,510 A | 6/1989 | Grunden et al. | |
| 4,872,828 A | 10/1989 | Mierzwinski et al. | |
| 4,948,044 A | 8/1990 | Cacciatore | |
| D310,338 S | 9/1990 | Cureton | |
| 4,955,806 A | 9/1990 | Grunden et al. | |
| 5,025,134 A | 6/1991 | Bensoussan et al. | |
| 5,081,411 A | 1/1992 | Walker | |
| 5,158,477 A | 10/1992 | Testa et al. | |
| 5,160,853 A | 11/1992 | Simon et al. | |
| 5,175,439 A | 12/1992 | Haerer et al. | |
| 5,192,874 A | 3/1993 | Adams | |
| 5,218,235 A * | 6/1993 | Patterson et al. | 307/39 |
| 5,255,179 A | 10/1993 | Zekan | |
| 5,272,427 A | 12/1993 | Nold et al. | |
| 5,277,244 A | 1/1994 | Mehta | |
| 5,304,781 A | 4/1994 | Stalsberg | |
| 5,347,982 A | 9/1994 | Binzer et al. | |
| 5,367,795 A | 11/1994 | Iverson et al. | |
| 5,506,569 A | 4/1996 | Rowlette | |
| 5,572,104 A | 11/1996 | Nold et al. | |
| 5,579,197 A | 11/1996 | Mengelt et al. | |
| 5,589,741 A | 12/1996 | Terman et al. | |
| 5,611,484 A | 3/1997 | Uhrich | |
| 5,635,896 A | 6/1997 | Tinsley | |
| 5,664,202 A | 9/1997 | Chen et al. | |
| 5,697,552 A | 12/1997 | McHugh et al. | |
| 5,736,795 A * | 4/1998 | Zuehlke et al. | 307/130 |
| 5,768,116 A | 6/1998 | Kompelien | |
| D409,505 S | 5/1999 | Janda et al. | |
| 5,903,139 A | 5/1999 | Kompelien | |
| 5,957,374 A | 9/1999 | Bias et al. | |
| 6,043,611 A | 3/2000 | Gradzki et al. | |
| 6,060,719 A | 5/2000 | DiTucci et al. | |
| 6,084,518 A | 7/2000 | Jamieson | |
| 6,121,889 A | 9/2000 | Janda et al. | |
| 6,222,719 B1 | 4/2001 | Kadah | |
| 6,275,160 B1 | 8/2001 | Ha | |
| 6,288,458 B1 * | 9/2001 | Berndt | 307/130 |
| 6,315,211 B1 | 11/2001 | Sartain et al. | |
| 6,356,038 B2 | 3/2002 | Bishel | |
| D455,359 S | 4/2002 | Stekelenburg | |
| 6,401,469 B1 | 6/2002 | Dennis et al. | |
| 6,490,174 B1 | 12/2002 | Kompelien | |
| 6,490,714 B1 | 12/2002 | Kurniawan et al. | |
| 6,509,838 B1 | 1/2003 | Payne et al. | |
| 6,566,768 B2 | 5/2003 | Zimmerman et al. | |
| 6,657,418 B2 | 12/2003 | Atherton | |
| 6,743,010 B2 | 6/2004 | Bridgeman et al. | |
| 6,794,771 B2 | 9/2004 | Orloff | |
| D500,686 S | 1/2005 | Stekelenburg | |
| D500,687 S | 1/2005 | Morrison et al. | |
| 6,886,754 B2 | 5/2005 | Smith et al. | |
| 7,142,988 B1 | 11/2006 | Johnson | |
| D534,440 S | 1/2007 | Stekelenburg | |
| D575,646 S | 8/2008 | Ni et al. | |
| 7,476,988 B2 | 1/2009 | Mulhouse et al. | |
| 7,642,674 B2 * | 1/2010 | Mulhouse et al. | 307/112 |
| 7,755,220 B2 | 7/2010 | Sorg et al. | |
| 7,834,591 B2 | 11/2010 | Hussain et al. | |
| 8,110,945 B2 | 2/2012 | Simard et al. | |
| 2002/0181251 A1 * | 12/2002 | Kompelien | 363/17 |
| 2002/0186070 A1 | 12/2002 | Wall et al. | |
| 2003/0064335 A1 | 4/2003 | Canon | |
| 2003/0090243 A1 | 5/2003 | Atherton | |
| 2003/0231001 A1 | 12/2003 | Bruning | |
| 2004/0012477 A1 | 1/2004 | Engler et al. | |
| 2004/0209209 A1 | 10/2004 | Chodacki et al. | |
| 2004/0239297 A1 * | 12/2004 | Sinha et al. | 323/235 |
| 2004/0251848 A1 | 12/2004 | Kim | |
| 2006/0071640 A1 * | 4/2006 | McCool et al. | 320/116 |
| 2006/0102732 A1 | 5/2006 | Garrett et al. | |
| 2007/0115135 A1 | 5/2007 | Mulhouse et al. | |
| 2007/0228183 A1 | 10/2007 | Kennedy et al. | |
| 2007/0247876 A1 * | 10/2007 | Garabandic | 363/17 |
| 2007/0296280 A1 | 12/2007 | Sorg et al. | |
| 2009/0273958 A1 * | 11/2009 | Baby | 363/127 |
| 2010/0026379 A1 | 2/2010 | Simard et al. | |

OTHER PUBLICATIONS

Aube, "ETW 190 Wall Switch Timer Features," 1 page, prior to Jul. 29, 2008.
Aube, "T1032-3W Installation and User Guide, 400-032-001-B," 2 pages, Nov. 30, 2006.
Aube, "T1033 Installation and User Guide, 400-033-001-C," 2 pages, Nov. 30, 2006.
Aube, "T1034-3W Installation and User Guide, 400-034-001-D," 2 pages, Mar. 13, 2007, and Aube, "T1034-3W/T1035 Addendum, 400-034-003-B," 2 pages, Mar. 13, 2007.
Aube, "T1035 Installation and User Guide, 400-035-001-C," 2 pages, Mar. 13, 2007, and Aube, "T1034-3W/T1035 Addendum, 400-034-003-B," 2 pages, Mar. 13, 2007.
Aube, "T1040 Installation and User Guide, 400-040-001-A," 2 pages, Jan. 15, 2007.
Aube, "T1044 Installation and User Guide, 400-044-001-B," 4 pages, Jan. 9, 2007.
Aube, "T1052A-3W Installation and User Instructions, 720-052002," 2 pages, prior to Jul. 29, 2008.
Aube, "T1054A-06-3W Installation and User Instructions, 920-054-001-00-1-0," 3 pages, prior to Jul. 29, 2008.
Intermatic, ET616 In-Wall Electronic Timer, p. 96, prior to Jul. 29, 2008.
Intermatic, ET724 Electronic I-Wall Timer, p. 98, prior to Jul. 29, 2008.
Intermatic, "Appliance and Wall Switch Timers," 1 page, prior to Jul. 29, 2008.
Intermatic, "Easyset Programming the Intermatic EJ500C Timer," 1 page, prior to Jul. 29, 2008.
Intermatic, "Series EI400 Decorator Electronic Auto-Off Timer," p. 59, prior to Jul. 29, 2008.
Intermatic, "Series EI500 Decorator Digital 7-Day Time Switch," p. 60, prior to Jul. 29, 2008.
Intermatic, "Series EI600 7-Day Astro Time Switch," p. 61, prior to Jul. 29, 2008.
Intermatic Incorporated, "EI500 Installation and User Instructions," 2 pages, prior to Jul. 29, 2008.
Intermatic Incorporated, "EI500 Installation and Operating Instructions," 4 pages, prior to Jul. 29, 2008.
Intermatic Incorporated, "Expanded E1600 p. 1 Drawing, 158EI13058," 1 page, prior to Jul. 29, 2008.
Intermatic Incorporated, "EI500 Installation and User Instructions," 158-00413, 4 pages, prior to Jul. 29, 2008.
Intermatic Incorporated, "EI600 Series Installation and User Instructions," 4 pages, prior to Jul. 29, 2008.
Intermatic Incorporated, "EI20 Installation and Operating Instructions," 2 pages, prior to Jul. 29, 2008.
Leviton, Decora, Timer Switches for Energy Management, Product Specifications, 4 pp., prior to Jul. 29, 2008.
Leviton, "Programmable Timer Switches," 2 pp, prior to Jul. 29, 2008.
Leviton, "Decora 24-Hour Programmable Timer Switch, Installation Instructions, DI-0006124H-20A-A0," 2 pages, Feb. 14, 2002.
"Suntracker 100 Series Information and Instructions," Sangamo Limited, P/N 143370, Issue H, 6 pages, prior to Jul. 29, 2008.
Swylite Corporation, "LST100 Installation and Operating Instructions," Rev. B., 2 pages prior to Jul. 29, 2008.
Programmable Thermostat by Honeywell. Magic Stat. Programming and Installation Instructions. 14 pages. 1993.
Honeywell. Magic Stat CT3200 Programmable Thermostat. Installation and Programming Instructions. 24 pages. 2001.
Honeywell, "Electromechanical Thermostats," 2 pages, 2002.

* cited by examiner

POWER STEALING CIRCUITRY FOR A CONTROL DEVICE

This application is a continuation of co-pending U.S. patent application Ser. No. 12/182,077, filed Jul. 29, 2008, and entitled "POWER STEALING CIRCUITRY FOR A CONTROL DEVICE", which is incorporated herein by reference.

FIELD

The present invention generally relates to control devices, and more particularly, to power stealing circuits for supplying power to control devices.

BACKGROUND

Control devices are often provided in building control and other systems to control power that is applied to a load. In some cases, such control devices can be powered by transformers or the like, which are configured to delivers a voltage suitable for powering the control devices. Alternatively, or in addition, some control devices may be powered by a battery or the like. Because transformers and batteries can add expense and complexity to many systems, power stealing circuits are sometimes used.

Some control devices may include a "power stealing" circuit that steals power from an electrical signal that powers the load. The power stealing circuit can power the control device during normal operation. A difficulty that can be encountered in such systems is, when stealing power, the electrical signal that powers the load may be affected by the power stealing circuitry, causing unexpected or reduced performance and increased Electro-Magnetic Interference (EMI). Accordingly, there is a need for new and improved power stealing circuits for power control devices.

SUMMARY

The present invention relates generally to control devices, and more particularly, to power stealing for providing operating power to a control device. In one illustrative embodiment, a power steal circuit may periodically or intermittently divert power from a power source to a power stealing block. When power is diverted to the power stealing block, the power stealing block may steal power from the power source and store the stolen power on a storage device. The storage device may then provide operating power to a control device.

In some embodiments, the power stealing block may include a first path for charging the storage device when a switch is ON, and a second path for charging the storage device when the switch is off. The switch may be switched OFF when, for example, the voltage provided by the rectifier is greater than a threshold voltage, the voltage detected on the storage device is greater than a threshold value, and/or when a control signal from a controller disables the switch.

An illustrative method for stealing power for a control device may include periodically or intermittently diverting power from a power source to a power stealing block. When power is diverted to the power stealing block, a storage device may be charged via a first path if it is desirable to charge the storage device faster, and the storage device may be charged via a second path if it is desirable to charge the storage device slower. Operating power may be provided to the control device from the storage device.

The preceding summary is provided to facilitate an understanding of some of the innovative features unique to the present invention and is not intended to be a full description. A full appreciation of the invention can be gained by taking the entire specification, claims, drawings, and abstract as a whole.

BRIEF DESCRIPTION

The invention may be more completely understood in consideration of the following detailed description of various illustrative embodiments of the invention in connection with the accompanying drawings, in which.

DETAILED DESCRIPTION

Figure 1:
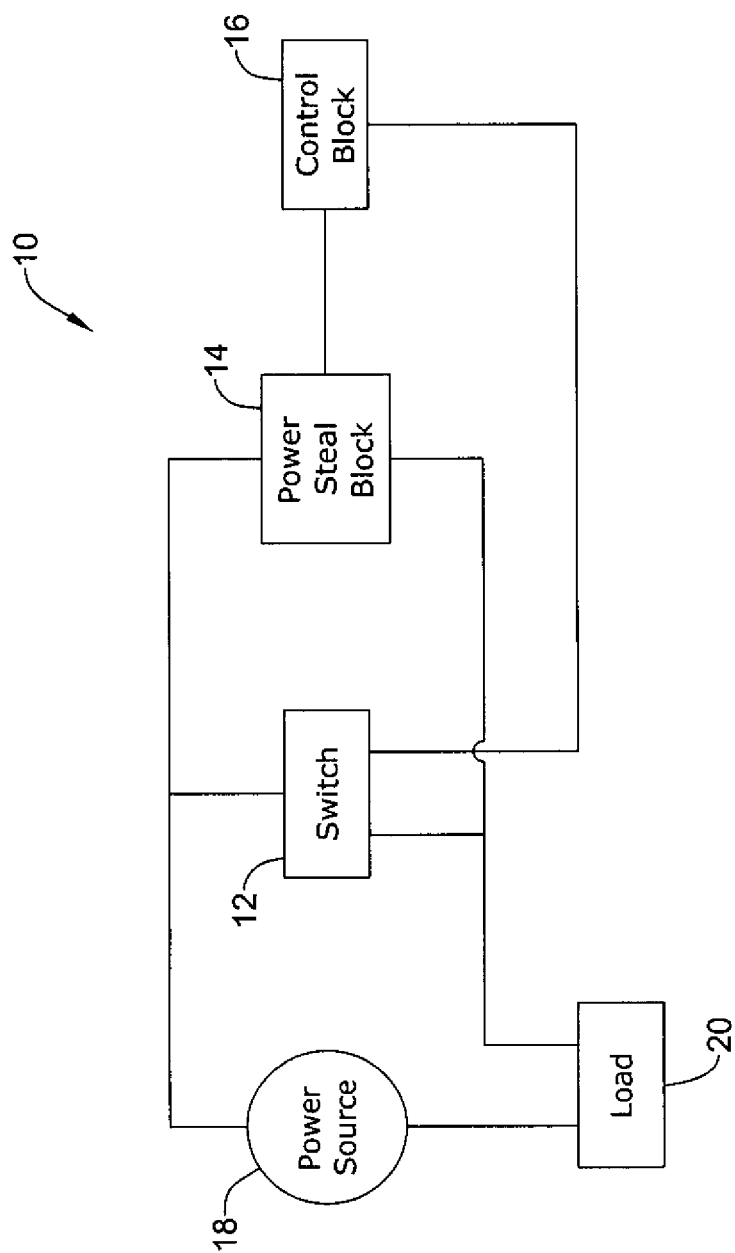
FIG. 1 is a block diagram of an illustrative embodiment of a control system including a power stealing circuitry.

The following description should be read with reference to the drawings wherein like reference numerals indicate like elements throughout the several views. The detailed description and drawings show several embodiments which are meant to be illustrative of the claimed invention.

FIG. 1 is a block diagram of an illustrative embodiment of a control system 10 including power stealing circuitry. Although not shown in FIG. 1, the illustrative control system 10 may include a switch (see, for example, switch 46 of FIG. 3) which may control the activation of the load 20. The switch 46 may have an "on" state in which the load is activated, and an "off" state in which the load is not activated. In some cases, the switch 46 may be manually switched by a user, and/or electronically controlled by a controller, such as control block 16.

When a switch 12 is in a high impedance OFF state and cuts off current to the load, there is ample voltage across the device and the power steal block 14 may steal operating power for control block 16. When the switch 12 is in the OFF state, any current diverted by the power stealing circuitry of the power steal block 14 may not significantly affect the performance of the load 20. However, during periods in which the switch 12 is ON, thereby energizing the load 20, there is normally no current drawn through the power steal block 14, and the power steal block 14 cannot steal operating power from the line.

The switch 12, which may be controlled by control block 16, is placed in its high impedance state for short intervals to allow power to be diverted to a power steal block 14. The power steal block 14 may use the diverted current to charge a charge storage device, which supplies operating power to the control block 16. Since the intervals are relatively short, there is minimal power loss to the load. However, such switching of switch 12 can cause EMI, which is undesirable in some applications.

As illustrated, the switch 12 may be provided in parallel to the power steal block 14, and may temporarily provide current from the power source 18 to the power steal block 14. The power steal block 14 may steal power when the switch 12 is turned off. In the illustrative embodiment, the switch 12 and power steal block 14 are provided in parallel with each other, and collectively in series with the load 20.

In some embodiments, the switch 12 may include a relay, a semiconductor device, such as a FET (field-effect transistor), a Triac (triode alternating current switch) or any other suitable switching device as desired. The switch 12 may have an "on" state and an "off" state. The "on" state may pass current from the power source 18 to the load 20. The "off" state may not pass current from the power source 18 to the load 20, and may create a voltage across the power steal block 14. In some cases, the switch 12 may have an input configured to receive a control signal from the control block 16 to control the switch 12 between the "on" state and the "off" state.

In the illustrative embodiment, the power steal block 14 may be configured to steal and store power for powering the control block 16. The power steal block 14 may include a charge storage device, such as a capacitor, a rechargeable battery, or other power storage device that can provide operating power to the control block 16.

The control block 16 may include a microprocessor, a microcontroller and/or any other suitable control circuit or device. The control block 16 may be configured to open and close switch 12 to either pass or not pass current through the switch 12. When the switch 46 is ON, the control block 16 may open switch 12 for short intervals such that power is periodically or intermittently delivered to the power steal block 14.

In the illustrative embodiment, the power source 18 may be a power supply of a building or other structure. For example, the power source 18 may be a line voltage supply of a building. In some cases, the line voltage may be 120 volts 60 Hz AC power. Alternatively, the power source 18 may supply another voltage, such as a 24 volts 60 Hz AC power, DC power, or any other suitable voltage and/or current.

The power source 18 may provide a sinusoidal electrical signal having a number of repeating cycles. In some cases, the control block 16 may turn switch 12 OFF at or near the beginning of each half wave of the power source 18 cycles. In this instance, the control block 16 may turn the switch 12 off for a period of time before and after each time the voltage crosses a zero (or other) volt line. The power steal block 14 may then be able to divert current from the power source 18 to a charge storage device such as a capacitor. When the power supply 18 voltage reaches a relatively higher voltage during each half cycle and/or the charge storage device is fully charged, the control block 16 may cause the switch 12 to turn ON and conduct current to the load 20. When this occurs, current may be directed away from the power steal block 14 due to the lower level of impendence of the switch 12 relative to the power steal block 14. The power "stolen" from each half cycle may be used to charge the charge storage device and then, in some cases, provide the operating voltage to at least temporarily power the control block 16.

In some embodiments, the load 20 may include a building component. Example building components may include building controllers and/or building devices. Example building devices may include dampers, valves, sensors, AC units, heating units (i.e. boilers, furnaces, etc.), ventilators, detectors (i.e. motion, fire, smoke, heat, air quality, glass, etc.), alarms, cameras, security lights, timers, occupancy sensors, light fixtures, sprinklers, motors, pumps, and/or other building device, as desired.

Figure 2:
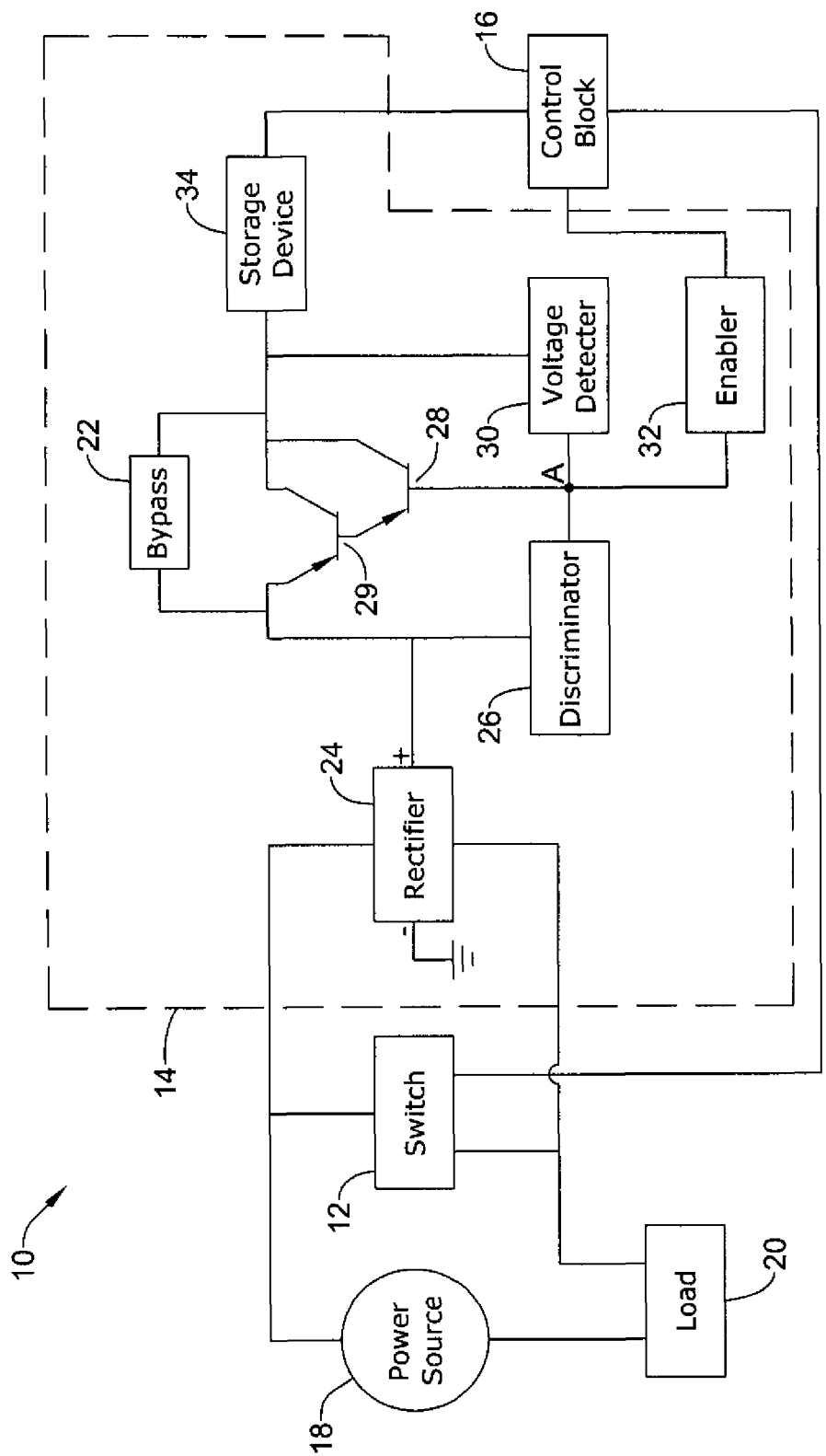
FIG. 2 is a block diagram of an illustrative embodiment of a control system similar to FIG. 1 showing an illustrative power steal block.

FIG. 2 is a block diagram of an illustrative control system 10 similar to FIG. 1 showing an illustrative power steal block 14. In the illustrative embodiment, when the switch 12 is in the "off" state, current from the power source 18 may flow to the power steal block 14. In the illustrative example, the power steal block 14 may include a charge storage device 34 for storing power for the control block 16. The storage device 34 may include a capacitor, a rechargeable battery, or any other suitable power storage device, as desired. The storage device 34 may be connected to the control block 16 to provide operational power to the control block 16.

As noted above, the control block 16 may periodically or intermittently turn the switch 12 OFF, such as when the voltage of the power source 18 is at or near a zero volt line and/or is otherwise relatively low. The control block may turn on the switch 12 when the voltage of the power source is at a higher voltage level. In one example, the switch 12 may be turned ON when the voltage of the sinusoidal electrical signal from power source 18 is about 20 volts, about 30 volts, about 40 volts, about 50 volts, about 60 volts, or any other suitable voltage level, as desired. When the switch 12 is switched to the ON state and to the OFF state, Electro-Magnetic Interference (EMI) may be generated. In some cases, the lower the voltage at which the switch 12 is activated, the less EMI will be generated.

In the illustrative embodiment, the power steal block 14 may include a rectifier 24 having an input connected to the power source 18 and an output connected to the load 20. That is, in the illustrative embodiment, the rectifier 24 is connected in parallel with the switch 12. In some cases, the rectifier 24 may convert alternating current (AC) from the power source 18 to direct current (DC). It is contemplated that the rectifier 24 may provide full-wave rectification or half-wave rectification as desired. When full-wave rectification is provided by rectifier 24, the positive output of the rectifier 24 may provide a DC signal.

In some embodiments, the DC signal provided from the positive output of the rectifier 24 may flow through a first path and/or a second path to charge the storage device 34. In some embodiments, the first path may be a relatively low impedance path relative to the second path, and the first path may charge the storage device at a faster rate than the second path.

In the illustrative embodiment, the first relatively low impedance path may include transistor 29 and/or transistor 28. As illustrated, transistors 28 and 29 may be bipolar junction transistors (BJTs), and may be coupled together in a Darlington pair configuration. However, it is contemplated that transistor 29 and/or transistor 28 may be FET devices or any other suitable switch(es) as desired. As shown, transistors 28 and 29 are PNP BJTs, but this is not required. In the illustrative embodiment, transistor 29 may have an emitter terminal connected to the output of the rectifier 24. The collector terminal of transistor 29 may be connected to the collector terminal of transistor 28 and the input of the storage device 34. The base terminal of transistor 29 may be connected to the emitter terminal of transistor 28. The base terminal of transistor 28 may be connected to node A.

If transistor 29 is turned OFF preventing current from flowing through the relatively low impedance path from the positive output of the rectifier 24 to the storage device 34, the second path, or bypass 22, may conduct current for charging the storage device 34. In some cases, the bypass 22 may be configured to include a resistor to provide a relatively higher impedance path to the storage device 34.

In the illustrative embodiment, the power steal block 14 may also include a discriminator 26, a voltage detector 30, and/or an enabler 32 to help control the conduction of charge to the storage device 34 via the first relatively low impedance path or via the bypass 22. Each of discriminator 26, voltage detector 30, and enabler 32 may have an output connected to node A to control, at least in part, the state of transistor 29 through transistor 28. The output of discriminator 26, voltage detector 30, and/or enabler 32 may be able to shut transistor 29 off via transistor 28, thereby preventing current from flowing through the low impedance path through transistor 29 and to the storage device 34, as desired.

In the illustrative embodiment, the discriminator 26 may have an input connected to the positive output of the rectifier 24, and an output coupled to, for example, the base of transistor 28. In some embodiments, the discriminator 26 may monitor a measure that is related to the voltage at the positive output terminal of the rectifier. If the voltage is greater than a threshold voltage, the discriminator 36 may switch transistor 28 off, routing power stealing current signal through the bypass 22. The bypass 22 may produce a voltage drop before reaching the input to the storage device 34. In some cases, the voltage drop of the bypass 22 may decreased the voltage at the input of the storage device 34 to a safe operating voltage. In one example, the threshold voltage of the discriminator 26 may be any voltage that may cause excessive current in the low impedance path transistors 28 and 29 and other components of the power steal circuit 14. Example threshold voltages may be 30 volts, 40 volts, 50 volts, 60 volts, 70 volts, 80 volts, 100 volts, or any other suitable voltage, depending on the application.

The voltage detector 30 may have an input connected to the input of the storage device 34, and an output coupled to the base of transistor 28. In some cases, the voltage detector 30 may detect a measure related to the voltage at the storage device 34. If the measure related to the voltage on the storage device 34 indicates that the voltage of the storage device 34 is above a threshold voltage, the voltage detector 30 may switch transistor 28 off. In this case, current may flow through the bypass 22 and charge the storage device 34 at a lower rate than through the low impedance path 29.

The enabler 32 may include an input connected to an output of the control block 16 and an output connected to the base of transistor 28. In some cases, the enabler 32 may be configured to switch transistor 28 on and off according to the control signal received from the control block 16. In some cases, if the control block 16 determines that no additional charge is needed on the storage device 34 during a current cycle, the control block 16 may turn off transistor 28 (and transistor 29) causing current to be conducted through the bypass 22 to the storage device 34.

Figure 3:
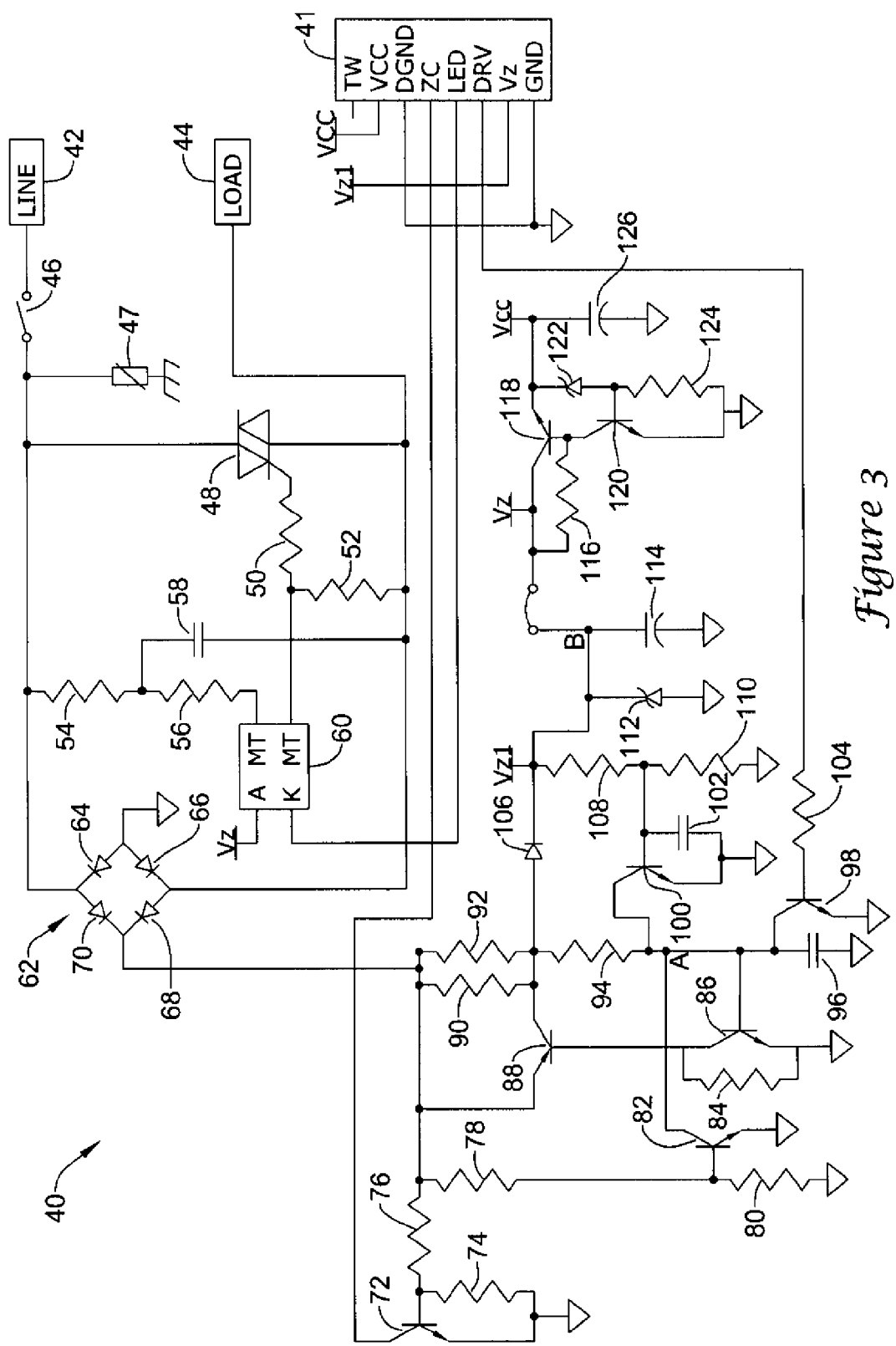
FIG. 3 is a schematic diagram of an illustrative control circuit including a switch and power stealing circuitry.

FIG. 3 is a schematic diagram of an illustrative control circuit 40 including a switch 48 and power stealing circuitry. In the illustrative embodiment, the control circuit 40 may be a lighting controller configured to control the power applied to a lighting device or fixture. This, however, is merely illustrative and is not meant to be limiting in any manner.

In the illustrative embodiment, the control circuit 40 includes an input terminal 42 configured to be connected to a line voltage, and an output terminal 44 configured to be connected to a load, such as one or more lighting devices or fixtures. In some embodiments, a switch 46 may be provided to selectively open and/or close the control circuit 40. Switch 46 may have an "on" state and an "off" state. The "on" state may activate the load by conducting current from the line voltage input terminal 42 to the load output terminal 44, via switch (Triac) 48. The "off" state of switch 46 may deactivate the load by prevent current from flowing from the line voltage input terminal 42 to the load output terminal 44. A first terminal of switch 46 may be connected to the input terminal 42. A second terminal of switch may be connected to a first terminal of Triac 48 and a first terminal of rectifier 62. The switch 46 may be manually operated and or controlled by a programmable lighting controller, which may include controller 41.

In the illustrative embodiment, a varistor 47 may be provided between the second terminal of the switch 46 and ground. In some cases, the varistor 47 may provide voltage clamping at the line voltage input terminal 42. In one example, varistor 47 may be a metal-oxide varistor that may be designed for applications requiring high peak surge current ratings and high energy absorption capability. For example, varistor 47 may be part number V07E320, available from Littelfuse™.

Switch (Triac) 48 may correspond to switch 12 shown in FIGS. 1-2, and may include a first terminal connected to the second terminal of switch 46, a second terminal connected to the output terminal 44, and a third terminal connected to a microcontroller 41 via a drive circuit 60. In some embodiments, and as described above, the controller 41 may periodically or intermittently turn the Triac 48 on to temporarily divert current to the power stealing circuitry. When the Triac 48 is switched on, current may flow through the Triac 48 to the output terminal 44, and relatively small amount of current, if any, may flow through the rectifier 62 to the output terminal 44. In some cases, Triac may be part number BTA16-600B available from STMicroelectronics®, but this is not required.

A drive circuit may be provided to drive the Triac 48 between the "on" state and "off" state. In the illustrative embodiment, the drive circuit may include a driver 60, resistors 50, 52, 54, and 56, and a capacitor 58. Resistor 50 may be provided between the third terminal of the Triac 48 and an output of the driver 60. Resistor 52 may be provided between the output of driver 60 and the output terminal 44. Resistors 54 and 56 may be provided between the second terminal of switch 46 and an output of the driver 60, forming a voltage divider. Capacitor 58 may include a first side provided between resistors 54 and 56, and a second side connected to the output terminal 44. Driver 60 may have an input connected to an output of microcontroller 41.

In some cases, the driver 60 may be a random phase Triac driver output optocoupler. For example, driver 60 may be part number MOC3023, available from Fairchild Semiconductor®. In some cases, the driver 60 may be designed to interface between an electronic controller such as controller 41 and Triac 48, and may help control resistive and inductive loads. In one illustrative embodiment, resistor 50 may be about 100 ohms, resistor 52 may be about 1 kilo-ohms, resistor 54 may be about 180 ohms, and resistor 56 may be about 108 ohms. Capacitor 58 may be about 0.047 microfarads.

In the illustrative embodiment, when the Triac 48 is switched to the OFF state, a voltage may develop across the rectifier 62. In one example, rectifier 62 may be a rectifier such as part number HD04 available from Diodes™, Inc. As illustrated, the rectifier 62 may be a full wave bridge rectifier including diodes 64, 66, 68, and 70. In some cases, rectifier 62 may have a first terminal between diodes 64 and 70 connected to the input terminal 42 of the control circuit 40, a second terminal may be provided between diodes 66 and 68 and may be connected to the output terminal 44, a third terminal may be provided between diodes 64 and 66 and be connected to ground, and a fourth terminal provided between diodes 68 and 70. The rectifier 62 may convert an alternating current signal received from the input terminal 42, to a direct current signal for the power stealing circuitry. In some cases, it is contemplated that a half-wave bridge may be used, if desired.

In the illustrative embodiment, a first current path may be provided from the fourth terminal of the rectifier 62 to capacitor 114 via transistor 88 and diode 106. In some cases, the first path may be a relatively low impedance path when the transistor 88 is on. A second path may be provided from the fourth terminal of the rectifier 62 to the capacitor 114 via bypass resistors 90/92 and diode 106. In one example, each bypass resistor 90/92 may be about 39 kilo-ohms. In some cases, bypass resistors 90/92 may be sufficiently large to produce a voltage drop, which may help protect the other components of the circuit from higher voltages. When activated, the first path may charge the capacitor 114 at a higher rate than the second path.

As illustrated, transistor 88 may be a PNP BJT. However, it is contemplated that any suitable transistor or other switching device may be used. In some cases, the emitter of transistor 88 may be connected to the fourth terminal of the rectifier 62. The collector may be connected to the anode of diode 106. The base of transistor 88 may be connected to the collector of transistor 86. Transistor 86 may include a NPN BJT, but this is not required. Transistor 86 may be configured to switch transistor 88 on and off. In some cases, the emitter of transistor 86 may be connected to ground. The base of transistor 86 may be connected to node A. In some cases, a resistor 84 may be provided across the collector and emitter of diode 86. Resistor 84 may be about 10 Mega-Ohms in some cases.

In some embodiments, resistor 94 may be provided between the collector of transistor 88 and node A. In some cases, resistor 94 may be about 39 kilo-ohms. A capacitor 96 may be provided between node A and ground. In some cases, capacitor 96 may be about 0.01 microfarads.

In the illustrative embodiment, resistor 104 and transistor 98 may form the enabler block for the power stealing circuit. As illustrated, resistor 104 may be coupled between the base of transistor 98 and a drive signal of controller 41. In some cases, resistor 104 may be about 100 kilo-ohms. The emitter of transistor 98 may be connected to ground and the collector may be connected to node A. In some cases, the drive signal may be a digital signal having a logic high and a logic low state. If a logic low is received from the controller 41, the enabler may disable the transistor 88.

In the illustrative embodiment, resistor 108, resistor 110, capacitor 102, and transistor 100 may form the voltage detector block of the power stealing circuit. In some cases, resistors 108 and 110 may form a voltage divider connected to the anode of diode 106 at one end and ground on the other end. The voltage divider may include an output between resistor 108 and 110 connected to the base of the transistor 100. Resistor 108 may be 680 kilo-ohms, and resistor 110 may be 43 kilo-ohms. Capacitor 102 may be a 0.1 microfarad capacitor. The collector of transistor 100 may be connected to node A. In the illustrative embodiment, the voltage detector may detect the voltage that is stored on the charge storage capacitor 114. If the voltage on the charge storage capacitor 114 is above a threshold limit, the voltage detector may switch transistor 88 off via transistor 86.

In the illustrative embodiment, resistor 78, resistor 80, and transistor 84 may form a discriminator. In some cases, resistors 78 and 80 may form a voltage divider having a first end connected to the fourth terminal of rectifier 62 and a second end connected to ground. The output of the voltage divider, between resistor 78 and resistor 80, may be connected to the base of transistor 82. In the example shown, resistor 78 may be 430 kilo-ohms, and resistor 80 may be 10 kilo-ohms. If the output of the voltage divider is greater than a threshold value, transistor 82 may turn off transistor 88 via transistor 86. In some cases, the discriminator may be configured to have a threshold voltage of about 30 volts, about 40 volts, about 50 volts, or any other suitable voltage, as desired.

Resistor 76 and resistor 78 may also form a voltage divider having a first end connected to the fourth terminal of the rectifier 62 and a second end connected to ground. An output of the voltage divider, between resistor 76 and resistor 74, may be connected to the base of transistor 72. The collector of transistor 72 may be connected to an I/O of microcontroller 41. The emitter of transistor 72 may be connected to ground. As illustrated, transistor may be a NPN BJT, but this is not required.

In some cases, a zener diode 112 may be provided having a cathode connected to node B and an anode connected to ground. The zener diode 112 may permit current to flow in the forward direction like a normal diode, but also in the reverse direction if the voltage is larger than the zener breakdown voltage. In the illustrative embodiment, the zener breakdown voltage may be about 24 volts. The Zener diode 112 may help clamp the voltage of $V_{Z1}$.

The output line $V_{Z1}$ at node B may be the power stealing voltage. As illustrated, $V_{Z1}$ may be provided as an input to the microcontroller 41 to provide operational power to the microcontroller 41. In some embodiments, node B may be connected to a voltage $V_Z$ via a jumper connection. The $V_Z$ line may be input to a collector of transistor 118. The emitter of transistor may be connected to a $V_{CC}$ line. A resistor 116 may be connected across the collector and the base of transistor 118. In some cases, resistor may be about 20 kil0-ohms. Base of transistor 118 may be connected to a collector of transistor 120. The emitter of transistor 120 may be connected to ground. Resistor 124 may be connected between the base of transistor 120 and ground. In some cases, resistor 124 may be about 820 ohms. A zener diode 122 may have an anode connected to the base of transistor 120 and a cathode connected to the emitter of transistor 118. In some cases, zener diode 122 may have a zener breakdown voltage of about 3.9 volt. Capacitor 126 may be connected between the emitter of transistor 118 and ground. In some cases, capacitor 126 may have a capacitance of 47 microfarads. As illustrated, transistor 118 and 120 may be NPN BJTs, but this is not required. When the jumper is provided, a lower voltage may be provided to a VCC input of the controller 41.

Figure 4:
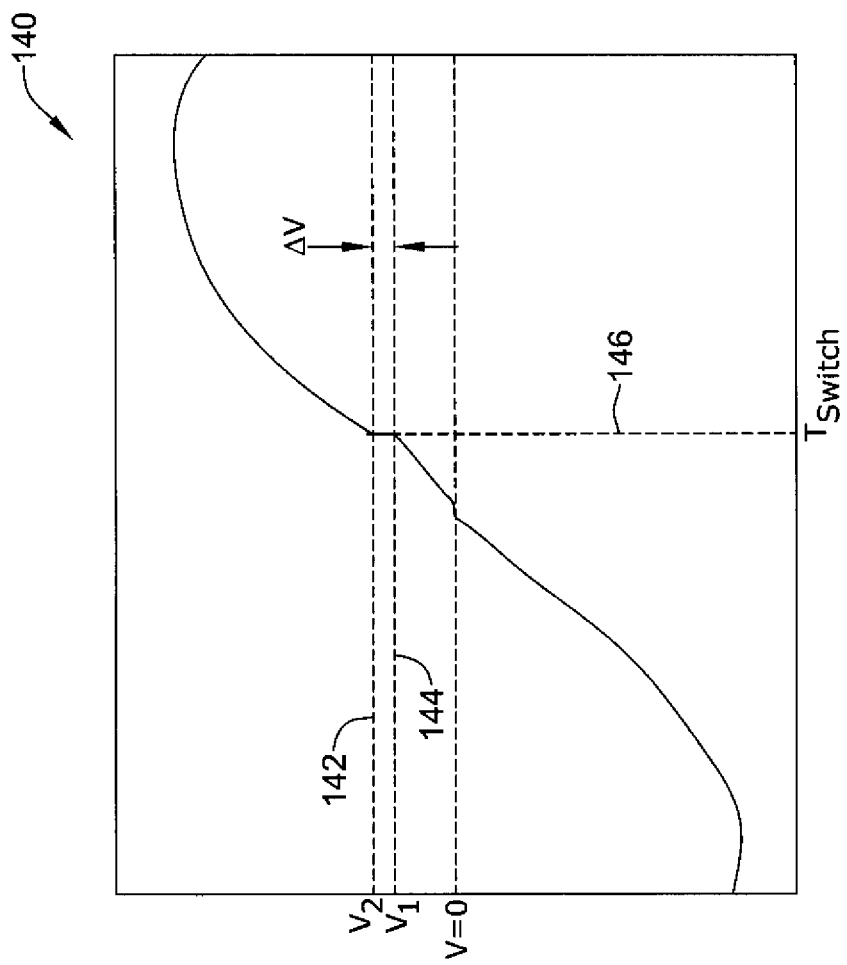
FIG. 4 is a graph of an illustrative waveform seen at the load with the illustrative power stealing circuit.

FIG. 4 is a graph of an illustrative waveform 140 seen at the load with the illustrative power stealing circuit. As illustrated, the current may pass through the controller 41 may turn ON Triac 48 when the line voltage is less than zero volts. When the line voltage crosses zero volts, and in the illustrative embodiment, the controller 41 may turn Triac 48 OFF, thereby temporarily diverting current to the power steal circuitry. At time $T_{SWITCH}$ 146, the Triac 48 may be switched back ON by the controller 41. As illustrated, when the Triac 48 is switched ON, there may be a change in voltage, ΔV at the load. In the illustrative graph, V2 142 may be about 49 volts and V1 144 may be about 37 volts, having a change of about 12 volts. This voltage change is relatively low, and may produce minimal EMI. As can be seen from FIG. 4, the waveform 140 is relatively smooth at the load, which may result in reduce EMI.

Figure 5:
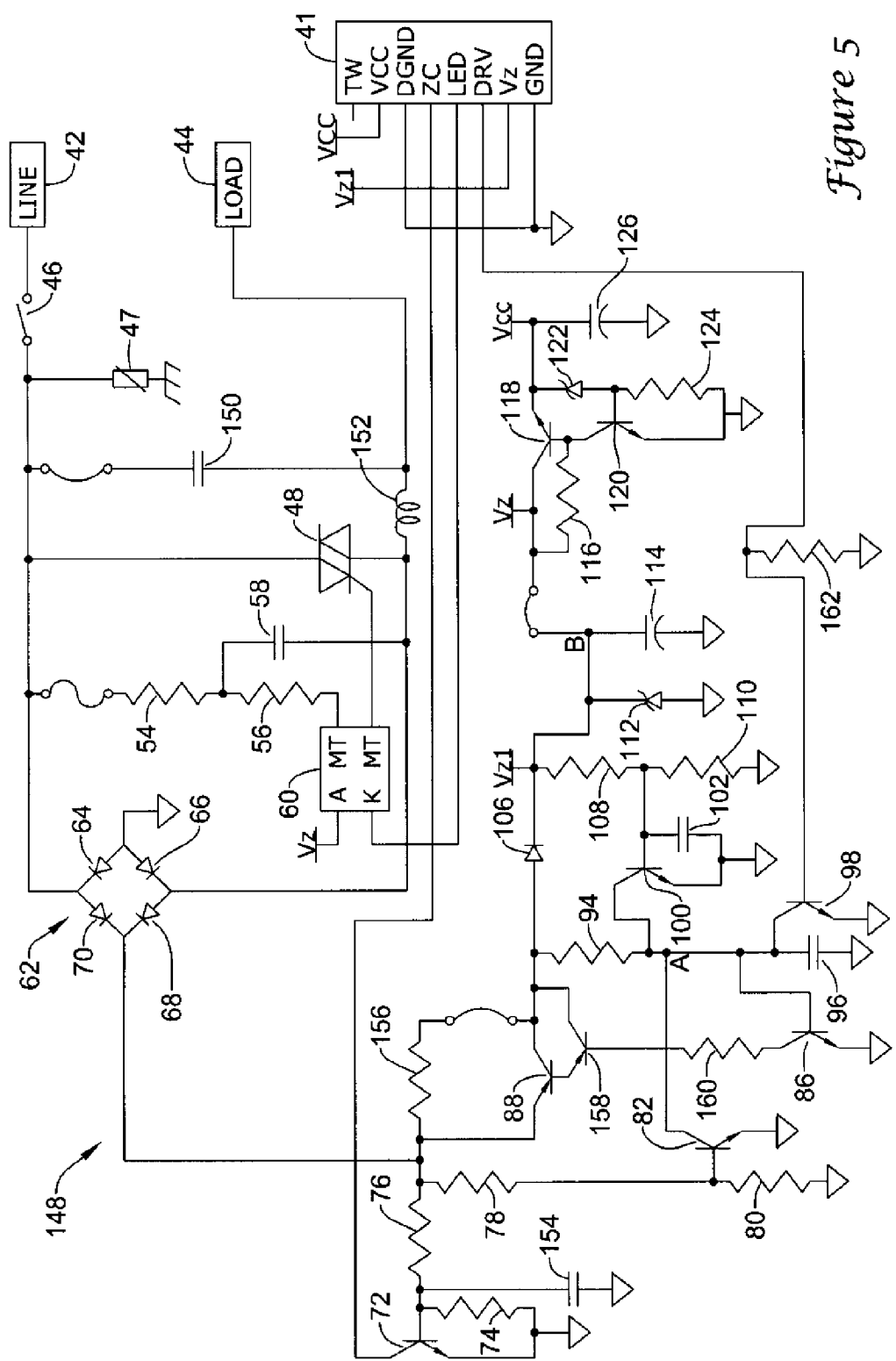
FIG. 5 is a schematic diagram of another illustrative control circuit including a switch and power stealing circuitry.

FIG. 5 is a schematic diagram of another illustrative control circuit 148 including a switch 48 and power stealing circuitry, similar to control circuit 40 of FIG. 3. In the illustrative embodiment, the control circuit 148 may be a lighting controller configured to control the power applied to a lighting device or fixture. This, however, is merely illustrative and is not meant to be limiting in any manner.

In the illustrative embodiment, the control circuit 148 includes an input terminal 42 configured to be connected to a line voltage, and an output terminal 44 configured to be connected to a load, such as one or more lighting devices or fixtures. In some embodiments, a switch 46 may be provided to selectively open and/or close the control circuit 40. Switch 46 may have an "on" state and an "off" state. The "on" state may activate the load by conducting current from the line voltage input terminal 42 to the load output terminal 44, via switch (Triac) 48. The "off" state of switch 46 may deactivate the load by prevent current from flowing from the line voltage input terminal 42 to the load output terminal 44. A first terminal of switch 46 may be connected to the input terminal 42. A second terminal of switch may be connected to a first terminal of Triac 48 and a first terminal of rectifier 62. The switch 46 may be manually operated and or controlled by a programmable lighting controller, which may include controller 41.

In the illustrative embodiment, a varistor 47 may be provided between the second terminal of the switch 46 and ground. In some cases, the varistor 47 may provide voltage clamping at the line voltage input terminal 42. In one example, varistor 47 may be a metal-oxide varistor that may be designed for applications requiring high peak surge current ratings and high energy absorption capability. For example, varistor 47 may be part number V07E320, available from Littelfuse™. In some embodiments, a capacitor 150 may be provided between the second terminal of the switch 46 and the load output terminal 44.

Switch (Triac) 48 may correspond to switch 12 shown in FIGS. 1-2, and may include a first terminal connected to the second terminal of switch 46, a second terminal connected to the output terminal 44, and a third terminal connected to a microcontroller 41 via a drive circuit 60. In some embodiments, and as described above, the controller 41 may periodically or intermittently turn the Triac 48 on to temporarily divert current to the power stealing circuitry. When the Triac 48 is switched on, current may flow through the Triac 48 to the output terminal 44, and relatively small amount of current, if any, may flow through the rectifier 62 to the output terminal 44. In some cases, Triac may be part number BTA16-600B available from STMicroelectronics®, but this is not required. In some cases, a inductor 152 may be provided between the output of the triac 48 and the load output terminal 44, as illustrated.

A drive circuit may be provided to drive the Triac 48 between the "on" state and "off" state. In the illustrative embodiment, the drive circuit may include a driver 60, resistors 50, 52, 54, and 56, and a capacitor 58. Resistor 50 may be provided between the third terminal of the Triac 48 and an output of the driver 60. Resistor 52 may be provided between the output of driver 60 and the output terminal 44. Resistors 54 and 56 may be provided between the second terminal of switch 46 and an output of the driver 60, forming a voltage divider. Capacitor 58 may include a first side provided between resistors 54 and 56, and a second side connected to the output terminal 44. Driver 60 may have an input connected to an output of microcontroller 41.

In some cases, the driver 60 may be a random phase Triac driver output optocoupler. For example, driver 60 may be part number MOC3023, available from Fairchild Semiconductor®. In some cases, the driver 60 may be designed to interface between an electronic controller such as controller 41 and Triac 48, and may help control resistive and inductive loads. In one illustrative embodiment, resistor 50 may be about 100 ohms, resistor 52 may be about 1 kilo-ohms, resistor 54 may be about 180 ohms, and resistor 56 may be about 108 ohms. Capacitor 58 may be about 0.047 microfarads.

In the illustrative embodiment, when the Triac 48 is switched to the OFF state, a voltage may develop across the rectifier 62. In one example, rectifier 62 may be a rectifier such as part number HD04 available from Diodes™, Inc. As illustrated, the rectifier 62 may be a full wave bridge rectifier including diodes 64, 66, 68, and 70. In some cases, rectifier 62 may have a first terminal between diodes 64 and 70 connected to the input terminal 42 of the control circuit 40, a second terminal may be provided between diodes 66 and 68 and may be connected to the output terminal 44, a third terminal may be provided between diodes 64 and 66 and be connected to ground, and a fourth terminal provided between diodes 68 and 70. The rectifier 62 may convert an alternating current signal received from the input terminal 42, to a direct current signal for the power stealing circuitry. In some cases, it is contemplated that a half-wave bridge may be used, if desired.

In the illustrative embodiment, a first current path may be provided from the fourth terminal of the rectifier 62 to capacitor 114 via transistor 88, transistor 158, and/or diode 106. In some cases, the first path may be a relatively low impedance path when the transistor 88 is on. A second path may be provided from the fourth terminal of the rectifier 62 to the capacitor 114 via bypass resistor 156 and diode 106. In one example, bypass resistor 156 may be about 18 kilo-ohms. In some cases, bypass resistor 156 may be sufficiently large to produce a voltage drop, which may help protect the other components of the circuit from higher voltages. When activated, the first path may charge the capacitor 114 at a higher rate than the second path.

As illustrated, transistor 88 may be a PNP BJT. However, it is contemplated that any suitable transistor or other switching device may be used. In some cases, the emitter of transistor 88 may be connected to the fourth terminal of the rectifier 62. The collector may be connected to the anode of diode 106. The base of transistor 88 may be connected to the emitter of transistor 158. As illustrated, transistor 158 may be a PNP BJT. However, it is contemplated that any suitable transistor or other switching device may be used. In some cases, as mentioned previously, the emitter of transistor 158 may be connected to the base of transistor 88. The collector may be connected to the anode of diode 106. The base of transistor 158 may be connected to a first terminal of resistor 160. A second terminal of resistor 160 may be connected to a collector of transistor 86. Resistor 160 may be about 1 kilo-ohm in some cases. Transistor 86 may include a NPN BJT, but this is not required. Transistor 86 may be configured to switch transistors 88 and/or 158 on and off. In some cases, the emitter of transistor 86 may be connected to ground. The base of transistor 86 may be connected to node A.

In some embodiments, resistor 94 may be provided between the collector of transistors 88 and 158 and node A. In some cases, resistor 94 may be about 39 kilo-ohms. A capacitor 96 may be provided between node A and ground. In some cases, capacitor 96 may be about 0.01 microfarads.

In the illustrative embodiment, resistor 168 and transistor 98 may form the enabler block for the power stealing circuit. As illustrated, resistor 168 may have a first terminal coupled between the base of transistor 98 and a drive signal of controller 41 and a second terminal coupled to ground. In some cases, resistor 168 may be about 100 kilo-ohms. The emitter of transistor 98 may be connected to ground and the collector may be connected to node A. In some cases, the drive signal may be a digital signal having a logic high and a logic low state. If a logic low is received from the controller 41, the enabler may disable the transistors 88 and/or 158.

In the illustrative embodiment, resistor 108, resistor 110, capacitor 102, and transistor 100 may form the voltage detector block of the power stealing circuit. In some cases, resistors 108 and 110 may form a voltage divider connected to the anode of diode 106 at one end and ground on the other end. The voltage divider may include an output between resistor 108 and 110 connected to the base of the transistor 100. Resistor 108 may be 680 kilo-ohms, and resistor 110 may be 43 kilo-ohms. Capacitor 102 may be a 1 nanofarad capacitor. The collector of transistor 100 may be connected to node A. In the illustrative embodiment, the voltage detector may detect the voltage that is stored on the charge storage capacitor 114. If the voltage on the charge storage capacitor 114 is above a threshold limit, the voltage detector may switch transistors 88 and/or 158 off via transistor 86.

In the illustrative embodiment, resistor 78, resistor 80, and transistor 82 may form a discriminator. In some cases, resistors 78 and 80 may form a voltage divider having a first end connected to the fourth terminal of rectifier 62 and a second end connected to ground. The output of the voltage divider, between resistor 78 and resistor 80, may be connected to the base of transistor 82. In the example shown, resistor 78 may be 430 kilo-ohms, and resistor 80 may be 10 kilo-ohms. If the output of the voltage divider is greater than a threshold value, transistor 82 may turn off transistors 88 and/or 158 via transistor 86. In some cases, the discriminator may be configured to have a threshold voltage of about 30 volts, about 40 volts, about 50 volts, or any other suitable voltage, as desired.

Resistor 76 and resistor 74 may also form a voltage divider having a first end connected to the fourth terminal of the rectifier 62 and a second end connected to ground. An output of the voltage divider, between resistor 76 and resistor 74, may be connected to the base of transistor 72. The collector of transistor 72 may be connected to an I/O of microcontroller 41. The emitter of transistor 72 may be connected to ground. As illustrated, transistor may be a NPN WIT, but this is not required. In some cases, a capacitor 154 may have a first terminal coupled between resistor 74 and 76 and a second terminal coupled to ground.

In some cases, a zener diode 112 may be provided having a cathode connected to node B and an anode connected to ground. The zener diode 112 may permit current to flow in the forward direction like a normal diode, but also in the reverse direction if the voltage is larger than the zener breakdown voltage. In the illustrative embodiment, the zener breakdown voltage may be about 24 volts. The Zener diode 112 may help clamp the voltage of $V_{Z1}$.

The output line $V_{Z1}$ at node B may be the power stealing voltage. As illustrated, $V_{Z1}$ may be provided as an input to the microcontroller 41 to provide operational power to the microcontroller 41. In some embodiments, node B may be connected to a voltage $V_Z$ via a jumper connection. The $V_Z$ line may be input to a collector of transistor 118. The emitter of transistor may be connected to a $V_{CC}$ line. A resistor 116 may be connected across the collector and the base of transistor 118. In some cases, resistor may be about 20 kil0-ohms. Base of transistor 118 may be connected to a collector of transistor 120. The emitter of transistor 120 may be connected to ground. Resistor 124 may be connected between the base of transistor 120 and ground. In some cases, resistor 124 may be about 820 ohms. A zener diode 122 may have an anode connected to the base of transistor 120 and a cathode connected to the emitter of transistor 118. In some cases, zener diode 122 may have a zener breakdown voltage of about 3.9 volt. Capacitor 126 may be connected between the emitter of transistor 118 and ground. In some cases, capacitor 126 may have a capacitance of 47 microfarads. As illustrated, transistor 118 and 120 may be NPN BJTs, but this is not required. When the jumper is provided, a lower voltage may be provided to a VCC input of the controller 41.

Furthermore, it is to be understood that the foregoing sizes of the circuit components, such as resistors, capacitors, zener diodes, inductors, and the like, are merely illustrative and that any suitable size may be used, as desired.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A method for stealing power from an AC power source, the stolen power being used, at least at times, to power a control device, wherein the control device is configured to switch power "on" and "off" from the AC power source to a building control device, the method comprising:
    periodically or intermittently diverting power from the AC power source to a power stealing block;
    when power is diverted to the power stealing block, charging a charge storage device by supplying a first non-zero current via a first path if it is desirable to charge the charge storage device faster, and charging the charge storage device by supplying a second non-zero current via a second path if it is desirable to charge the charge storage device slower, wherein the first non-zero current is different from the second non-zero current; and
    providing operating power to the control device from the charge storage device.

2. The method of claim 1 wherein the charge storage device is charged via the second path if a voltage of the diverted power is above a threshold value.

3. The method of claim 1 wherein the charge storage device is charged via the second path if a voltage across the charge storage device is above a threshold value.

* * * * *